United States Patent
Vrinda et al.

(10) Patent No.: US 12,271,572 B2
(45) Date of Patent: Apr. 8, 2025

(54) UNIFIED USER INTERFACE FOR MONITORING HYBRID DEPLOYMENT OF COMPUTING SYSTEMS

(71) Applicant: Oracle International Corporation, Redwood Shores, CA (US)

(72) Inventors: Sriram Vrinda, Hudson, NH (US); Xiaobin Chen, Lexington, MA (US); Naimuddin Qureshi, Bhopal (IN); Hari Krishna Galla, Hyderabad (IN); John Mark Beresniewicz, Half Moon Bay, CA (US); Shravan Kumar Shivanagari, Hyderabad (IN); Paul James Tangen, Grantham, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/452,094

(22) Filed: Oct. 25, 2021

(65) Prior Publication Data

US 2023/0128408 A1    Apr. 27, 2023

(51) Int. Cl.
*G06F 11/34*    (2006.01)
*G06F 3/0482*    (2013.01)
*G06F 3/0484*    (2022.01)

(52) U.S. Cl.
CPC .......... *G06F 3/0482* (2013.01); *G06F 3/0484* (2013.01); *G06F 11/3428* (2013.01); *G06F 2203/04803* (2013.01)

(58) Field of Classification Search
CPC .. G06F 3/0482; G06F 3/0484; G06F 11/3428; G06F 2203/04803
See application file for complete search history.

(56) References Cited

U.S. PATENT DOCUMENTS

| | | | |
|---|---|---|---|
| 8,176,095 B2 * | 5/2012 | Murray | G06Q 30/0218 705/14.2 |
| 8,375,068 B1 * | 2/2013 | Platt | G06Q 10/10 705/7.29 |

(Continued)

OTHER PUBLICATIONS

User "cocus_ar." "Task Manager: disappearing network adapters after a while" [published Apr. 16, 2020], [online], [retrieved on Oct. 3, 2022]. Retrieved from the internet <URL: https://www.windowsphoneinfo.com/threads/task-manager-disappearing-network-adapters-after-a-while.333695/ > (Year: 2020).*

(Continued)

*Primary Examiner* — Tuyetlien T Tran
*Assistant Examiner* — Samuel Shen
(74) *Attorney, Agent, or Firm* — Invoke

(57) ABSTRACT

Techniques are described for generating a composite display of multiple user interface elements, each of which presents datasets corresponding to the operational parameters of computing resources even though the computer resources may operate in different computing environments. In some cases, the composite display includes a feature that enables a comparison of operational performance data between a target measurement period relative to a selectable reference period. The reference period may be manually selectable (Continued)

from a menu of candidate time periods or identified and/or selected by the system based on a similarity between data characteristics in the target measurement period and a baseline measurement period.

30 Claims, 7 Drawing Sheets

(56) References Cited

U.S. PATENT DOCUMENTS

| | | | |
|---|---|---|---|
| 10,592,555 | B1 | 3/2020 | Zhang et al. |
| 10,664,527 | B1 | 5/2020 | Henderson et al. |
| 10,902,045 | B2* | 1/2021 | Ericson .................. G06F 40/30 |
| 2010/0082602 | A1 | 4/2010 | Ganapathi et al. |
| 2012/0173444 | A1* | 7/2012 | Zik ...................... G06Q 30/018 |
| | | | 705/317 |
| 2015/0073960 | A1* | 3/2015 | Santhi ................. H04L 41/5054 |
| | | | 705/35 |
| 2015/0193263 | A1* | 7/2015 | Nayyar .................. G06Q 10/06 |
| | | | 707/703 |
| 2017/0041345 | A1* | 2/2017 | Mandalia ............. H04L 63/107 |
| 2017/0178080 | A1* | 6/2017 | Abebe .................. G06F 16/383 |
| 2018/0314735 | A1 | 11/2018 | Liu et al. |
| 2019/0086234 | A1* | 3/2019 | Ranjan ............... B60H 1/00585 |
| 2019/0294596 | A1 | 9/2019 | Yan et al. |
| 2020/0034429 | A1 | 1/2020 | Shukla et al. |
| 2020/0201895 | A1 | 6/2020 | Sims et al. |

OTHER PUBLICATIONS

E. Garcia, "A Tutorial on Distance and Similarity," available online at < http://www.minerazzi.com/tutorials/distance-similarity-tutorial.pdf >, 2015, 6 pages.

E. Garcia, "Cosine Similarity Tutorial," available online at < http://www.minerazzi.com/tutorials/cosine-similarity-tutorial.pdf >, 2015, 11 pages.

E. Garcia, "Term Vector Theory and Keyword Weights," available online at < http://www.minerazzi.com/tutorials/term-vector-1 >, 2016, 7 pages.

E. Garcia, "The Binary and Term Count Models," available online at < http://www.minerazzi.com/tutorials/term-vector-2 >, 2016, 10 pages.

E. Garcia, "The Classic TF-IDF Vector Space Model," available online at < http://www.minerazzi.com/tutorials/term-vector-3 >, 2016, 15 pages.

Maaten et al., "Visualizing Data Using t-SNE," Journal of Machine Learning Research, Nov. 2008, pp. 2579-2605.

Miklov et al., "Efficient Estimation of Word Representations in Vector Space," arXiv:1301.3781v3 [cs.CL] Sep. 7, 2013, 12 pages.

Pennington et al., "GloVe: Global Vectors for Word Representation," Proceedings of the 2014 Conference on Empirical Methods in Natural Language Processing (EMNLP), Oct. 25-29, 2014, pp. 1532-1543.

\* cited by examiner

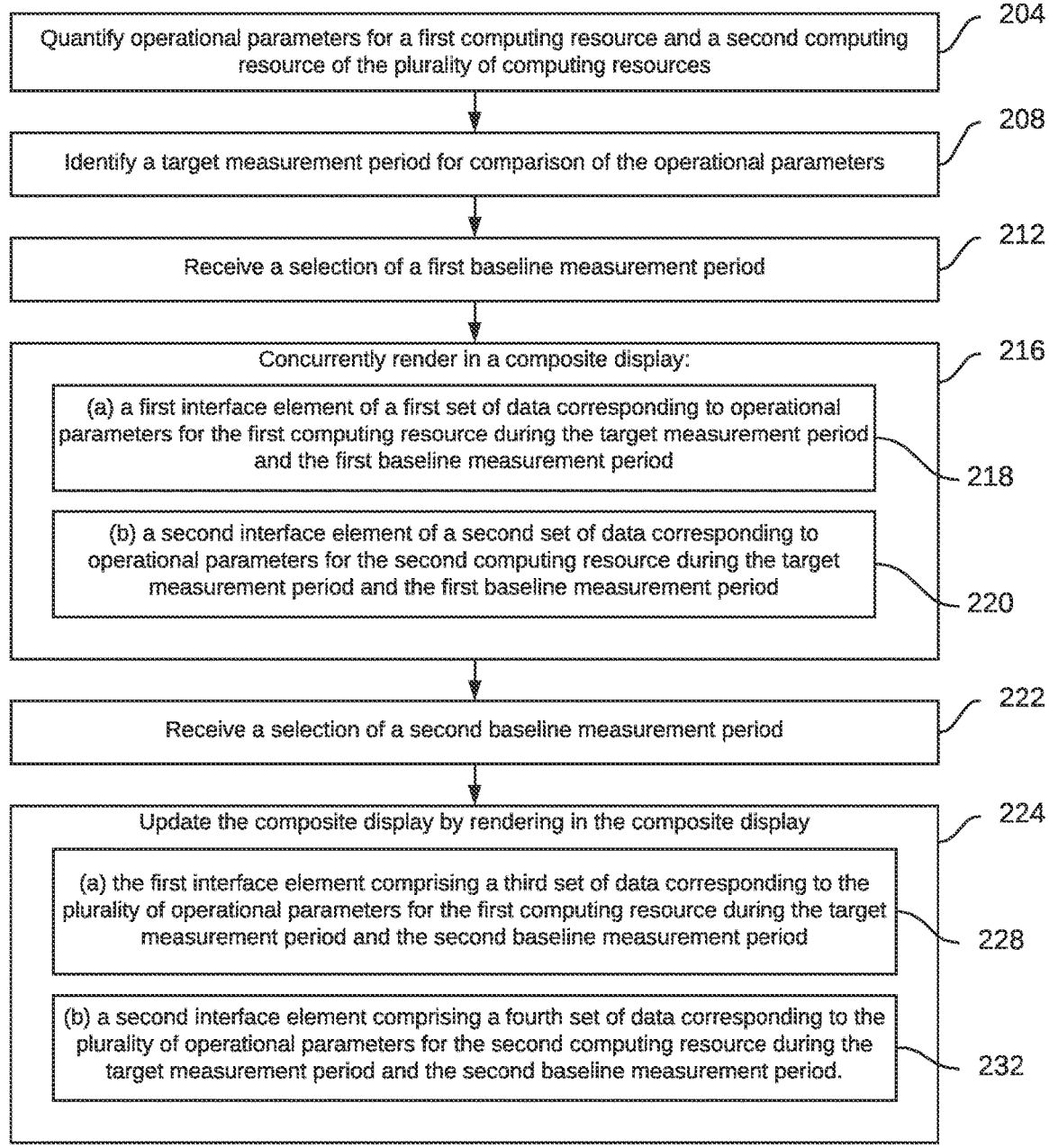

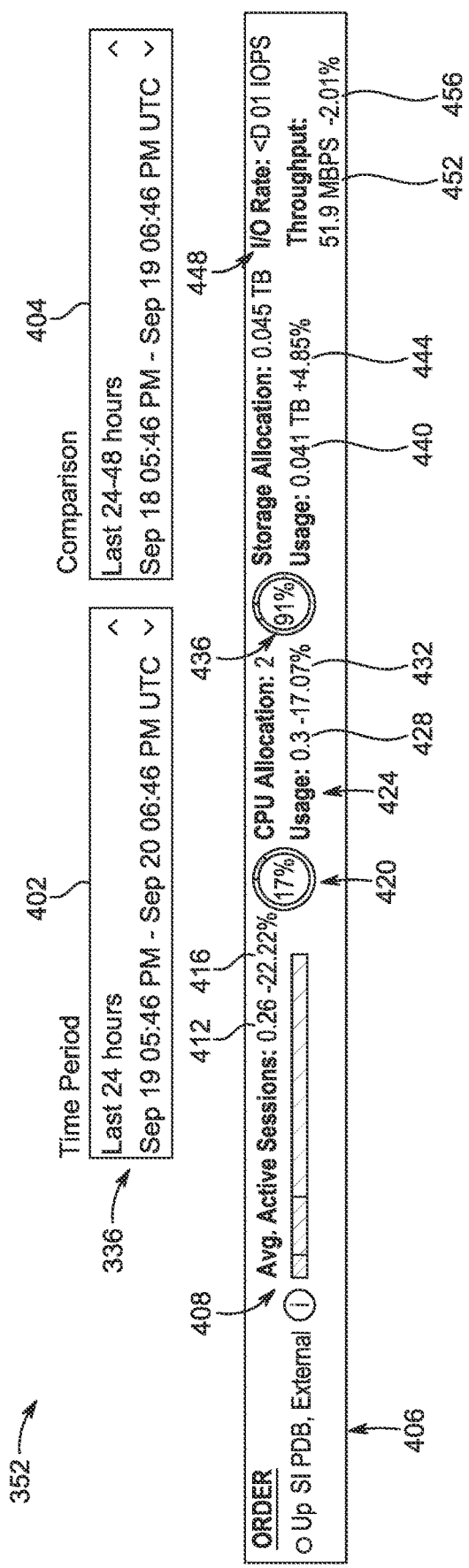
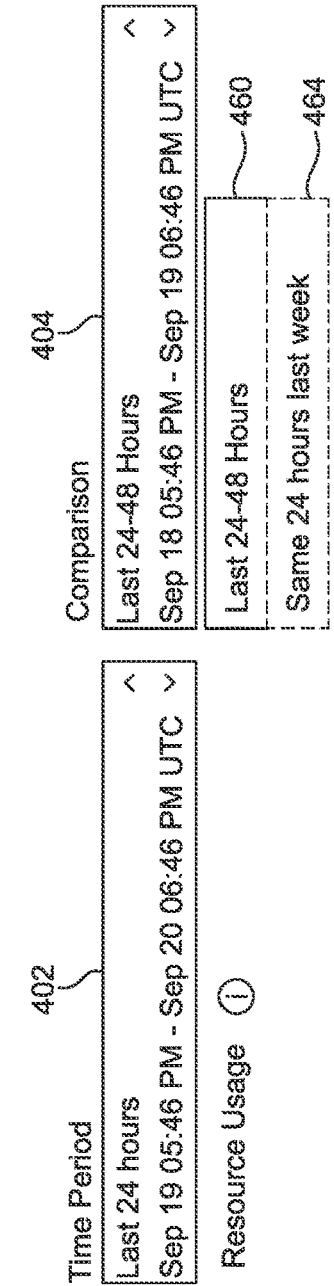
FIG. 4A
FIG. 4B

UNIFIED USER INTERFACE FOR MONITORING HYBRID DEPLOYMENT OF COMPUTING SYSTEMS

TECHNICAL FIELD

The present disclosure relates to monitoring the performance of a group of computing resources deployed in different system environments. In particular, the present disclosure relates to a unified user interface for monitoring hybrid deployment of computing systems across on-premise environments, off-premise environments, and/or cloud environments.

BACKGROUND

Database administrators have a variety of tools by which they may monitor the performance of databases. Systems may monitor the consumption of various resources associated with a database, such as the proportionate consumption of central processing unit (CPU) capacity and/or storage capacity that has been allocated to the database. These performance metrics may be displayed so that an administrator may determine database performance by visual inspection.

However, recent developments in distributed networks have complicated the detection and visual representation of database performance. With the development of cloud-based computing architectures, some databases may be distributed between multiple different types of network environments. For example, some databases associated with an entity may be associated with proprietary "on-premises" computing environments where other databases associated with the same entity may be stored in distributed, storage-as-service ("cloud") environments. In some examples, different portions of a same database may be distributed between these different computing environments.

Monitoring tools and corresponding display systems have not developed to keep pace with the developments in computing architectures. This leaves the administration and performance monitoring of databases (and other computing systems) disjointed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2 illustrates an example set of operations for generating a composite display that concurrently shows data corresponding to operational parameters for various computer resources in accordance with one or more embodiments;

FIGS. 4A and 4B illustrate specific features of an example composite display including interface elements for selecting a baseline measurement period and a target measurement period in accordance with one or more embodiments;

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. COMPOSITE DISPLAY GENERATION AND BASELINE MEASUREMENT PERIOD SELECTION
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

Embodiments display datasets corresponding to the operational parameters of computing resources operating in different computing environments. Some embodiments enable comparison of data corresponding to the operation of computing resources during a target measurement period relative to selectable reference periods. In some examples, the system receives user input selecting the reference period from a set of candidate time periods. In other examples, a system itself may select the reference period, instead of a user, from among a set of candidate reference periods.

One or more embodiments described in this Specification and/or recited in the claims may not be included in this General Overview section.

2. System Architecture

Figure 1:
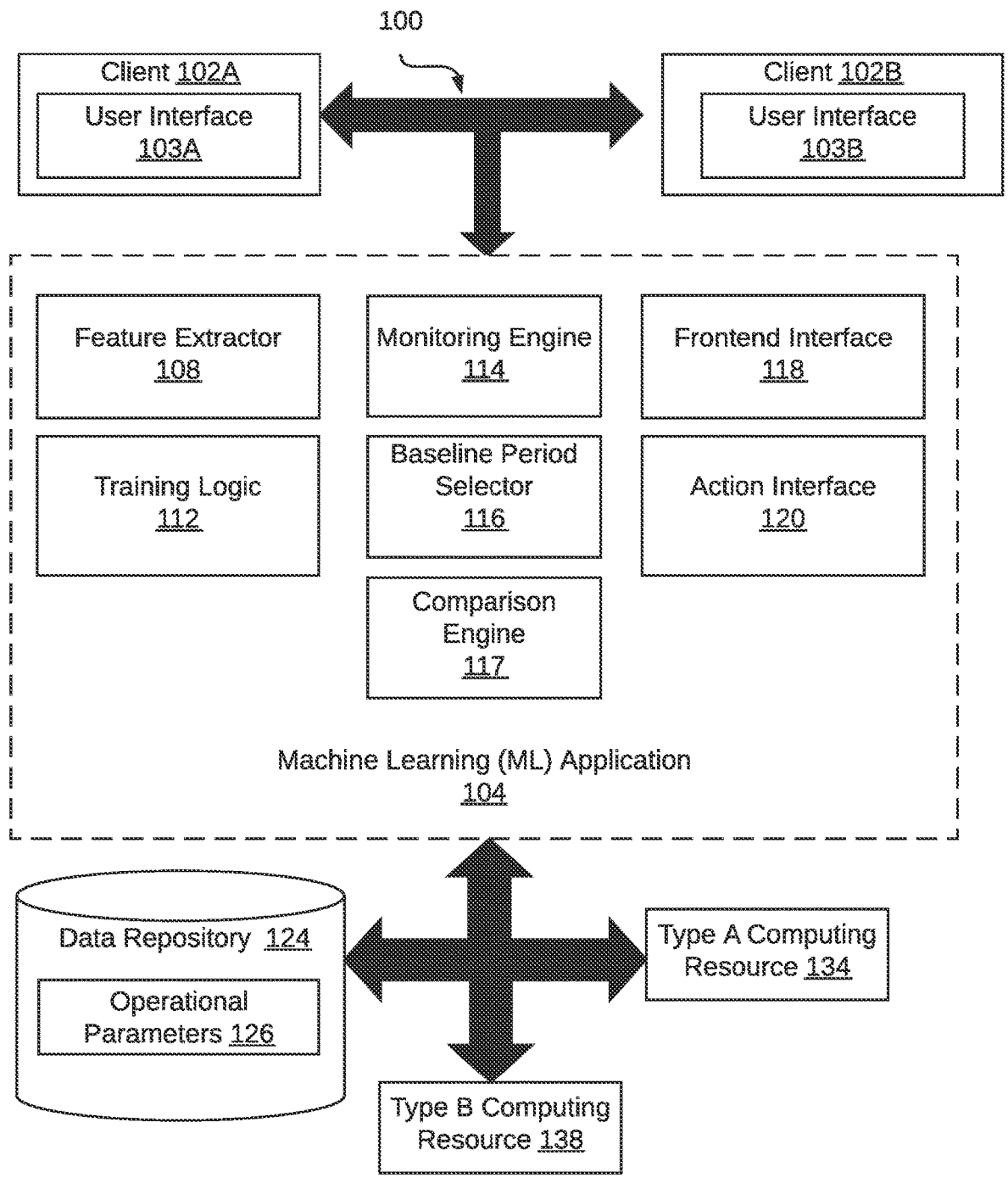
FIG. 1 illustrates a system in accordance with one or more embodiments.

FIG. 1 illustrates a system 100 in accordance with one or more embodiments. As illustrated in FIG. 1, system 100 includes clients 102A, 102B, a machine learning (ML) application 104, a data repository 124, and computer resources 134, 138. In one or more embodiments, the system 100 may include more or fewer components than the components illustrated in FIG. 1.

The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The clients 102A, 102B may be a web browser, a mobile application, or other software application communicatively coupled to a network (e.g., via a computing device). The clients 102A, 102B may interact with other elements of the system 100 directly or via cloud services using one or more communication protocols, such as HTTP and/or other communication protocols of the Internet Protocol (IP) suite.

In some examples, one or more of the clients 102A, 102B are configured to render corresponding composite displays 103A, 103B. The clients 102A, 102B and corresponding composite displays 103A, 103B may also be configured to receive user instructions and/or selections regarding operations described in FIG. 2. These user selections may include selecting a target measurement period, selecting (or changing) a baseline measurement period, or both. Example embodiments of the user interfaces 103A, 103B are illustrated in FIGS. 3, 4A, 4B, 5A, and 5B and described in detail below. The clients 102A, 102B may also transmit instructions and/or data items to the ML application 104 for analysis by the various components therein.

The clients 102A, 102B may also include a user device configured to render a graphic user interface (GUI), such as user interfaces 103A, 103B generated by the ML application 104 to display data corresponding to computing resource operational data during a target measurement period, a baseline measurement period, or both. The GUI may present an interface by which a user triggers execution of computing transactions, thereby requesting, rendering, generating and/or analyzing data items. In some examples, the GUI may include features that enable a user to view training data, classify training data, instruct the ML application 104, and other features of embodiments described herein. Furthermore, the clients 102A, 102B may be configured to enable a user to provide user feedback via a GUI regarding the accuracy of the ML application 104 analysis. That is, a user may label, using a GUI, an analysis generated by the ML application 104 as accurate or not accurate, thereby further revising or validating training data. This latter feature enables a user to label data analyzed by the ML application 104 so that the ML application 104 may update its training.

The ML application 104 of the system 100 may be configured to train one or more ML models using training data, prepare target data before ML analysis, and analyze data so as to select a baseline measurement period. As described herein, the system may use data corresponding to the baseline measurement period as a basis for comparison for data corresponding to the target measurement period.

While the system 100 depicts some of the elements as sub-components of the ML application 104, this need not be the case and is presented in FIG. 1 only for convenience. In one example, the ML application 104 may interact with the baseline period selector 116 to identify and select baseline periods to compare with a target measurement period.

The machine learning (ML) ML application 104 may be trained using operational performance data, type of transactions and time periods associated with the operational performance data, as well as weights or other labels applied to the various data. Once trained, the trained ML application 104 may identify and select a prior time period as a baseline measurement period that is similar to a target measurement period. Once selected, the baseline and target measurement periods may be rendered in a composite user interface, as described below.

In some examples, ML application 104 may include one or both of supervised machine learning algorithms and unsupervised machine learning algorithms. In some examples, the ML application 104 may be instantiated as a neural network in which various "hidden" layers of multiple neurons successively analyze data provided via an input layer to generate a prediction via an output layer. In other examples, any one or more of linear regression, logistic regression, linear discriminant analysis, classification and regression trees, naïve Bayes, k-nearest neighbors, learning vector quantization, support vector machine, bagging and random forest, boosting, back propagation, and/or clustering models may be adapted to perform the techniques described herein. In some examples, multiple trained ML models of the same or different types may be arranged in a ML "pipeline" so that the output of a prior model is processed by the operations of a subsequent model. In various examples, these different types of machine learning algorithms may be arranged serially (e.g., one model further processing an output of a preceding model), in parallel (e.g., two or more different models further processing an output of a preceding model), or both.

Other configurations of trained ML application 104 may include additional elements or fewer elements.

The machine learning (ML) application 104 includes a feature extractor 108, training logic 112, a monitoring engine 114, a baseline period selector 116, a comparison engine 117, a frontend interface 118, and an action interface 120.

The feature extractor 108 may be configured to identify characteristics associated with data items, such as operational parameter data generated by computing resources. The feature extractor 108 may generate corresponding feature vectors that represent the identified characteristics. For example, the feature extractor 108 may identify attributes within training data and/or "target" data that a trained ML model is directed to analyze. Once identified, the feature extractor 108 may extract characteristics from one or both of training data and target data.

The feature extractor 108 may tokenize some data item characteristics into tokens. The feature extractor 108 may then generate feature vectors that include a sequence of values, with each value representing a different characteristic token. In some examples, the feature extractor 108 may use a document-to-vector (colloquially described as "doc-to-vec") model to tokenize characteristics (e.g., as extracted from human readable text) and generate feature vectors corresponding to one or both of training data and target data. The example of the doc-to-vec model is provided for illustration purposes only. Other types of models may be used for tokenizing characteristics. In some examples, techniques associated with the operation of the feature extractor 108 in the tokenization of data items, and with the operation of the baseline measurement period selector 116 and the method 200 (described below) for the selection of baseline periods that have a comparable workload to that of the target measurement period are described in U.S. patent application Ser. No. 16/930,157, titled Term Vector Modeling of Database Workloads, filed on Jul. 15, 2020, which is incorporated herein in its entirety.

In other examples, the feature extractor 108 may identify attributes associated with operational parameters for various computing resources and/or identify the types of computing resources and their corresponding operational parameter data. The feature extractor 108 may tokenize the attributes and generate one or more feature vectors that correspond to the operational parameters and/or data associated with the operational parameters. For example, the feature extractor 108 may identify data corresponding to operational parameters such as throughput, I/O transaction rate, and CPU utilization for a particular target measurement period and computing system. The feature extractor 108 may then identify within the data the various operational parameter (i.e., attribute or characteristic) names, attribute definitions, attribute descriptions, permitted field values and/or permitted field value types (e.g., integer, string, alphanumeric characters). The feature extractor 108 may then process the identified data and/or attributes to generate one or more feature vectors.

The feature extractor 108 may append other features to the generated feature vectors. In one example, a feature vector may be represented as $[f_1, f_2, f_3, f_4]$, where $f_1, f_2, f_3$ correspond to characteristic tokens and where $f_4$ is a non-characteristic feature. Example non-characteristic features may include, but are not limited to, a label quantifying a weight (or weights) to assign to one or more characteristics of a set of characteristics described by a feature vector. In some examples, a label may indicate one or more classifications associated with corresponding characteristics.

As described above, the system may use labeled data for training, re-training, and applying its analysis to new (target) data. The feature extractor 108 may optionally be applied to new data (yet to be analyzed) to generate feature vectors from the new data. These new data feature vectors may facilitate analysis of the new data by one or more ML models, as described below. In the examples described below, the "new" data may be the target data that is used to identify a baseline measurement period that has a similarity to the target data for any of a variety of (optionally weighted) operational parameters and/or computing system types.

In some examples, the training logic 112 receives a set of data items as input (i.e., a training corpus or training data set). Examples of data items include, but are not limited to, data entities (e.g., structures and/or objects, such as fields, arrays, tables) associated with operational data from one or more computing systems, and the time period(s) that the data correspond(s) to. The data items used for training may comprise any one or more of the attributes and characteristics, such as those described above in the context of the feature extractor 108 (e.g., field names, field values, field value types).

In some examples, training data used by the training logic 112 to train the machine learning engine 110 includes feature vectors of data items that are generated by the feature extractor 108, described above.

The training logic 112 may be in communication with a user system, such as clients 102A, 102B. The clients 102A, 102B may include an interface used by a user to apply labels to the electronically stored training data set.

The monitoring engine 114 may receive data corresponding to operational performance data associated with one or both of the type A computing resource 134 and/or the type B computing resource 138. For example, the monitoring engine 114 may receive operational performance data from the computing resources 134, 138 via a network monitoring device (e.g., a test access point, or other similar packet network sampling system). The monitoring engine 114 may analyze the received data and process it in preparation for storage in the operational parameter store 126 of the data repository 124. For example, the monitoring engine 114 may identify attributions of the operational performance data, the date and time that the data were generated, and an identifier (or identifiers) of the computing resource that generated the data. The monitoring engine 114 may process, organize, and/or store these data for later analysis and/or retrieval.

The baseline period selector 116 may be in communication with one or both of the data repository 124 and/or the machine learning application 104. For example, the system may receive an instruction via a user interface (e.g., user interface 103A) to select a particular baseline measurement period. In one embodiment, the baseline period selector 116 receives this instruction of a particular baseline measurement period and accesses the data repository 124 to find the data stored therein that are associated with the particular baseline measurement period. Once identified, the baseline period selector 116 may access the data and provide the data to the comparison engine 117.

In another example, the system may instruct the baseline period selector 116 to identify a baseline measurement period that has similar characteristics to the target measurement period. In this example, the baseline period selector 116 may access machine learning features associated with the ML application 104 to execute a search and similarity analysis on stored data. In another embodiment, the baseline period selector 116 may use a cosine similarity analysis to identify a baseline measurement period that has similar characteristics to the target measurement period. For example, the baseline period selector 116 may select one or more periods, extract relevant period attributes and/or characteristics, and compare the extracted period attributes/characteristics to analogous attributes/characteristics for the target measurement period. The baseline period selector 116 may select a period as the baseline measurement period if the period has a cosine similarity to the target measurement period above a threshold and/or has a highest cosine similarity of the analyze periods. When using characteristics/attributes that are related to the types of tasks performed, the types computing resources used, the quantities of computing resources used (i.e., a "workload"), the system may thus select a baseline measurement period that is analogous and/or similar to the target measurement period. This process facilitates an informative comparison between target and baseline periods that are sufficiently similar so that comparing them may lead to valid conclusions. Once identified, baseline period selector 116 may access the data and provide the data to the comparison engine 117.

The comparison engine 117 receives target measurement period data from the monitoring engine 114 and baseline period data from the baseline period selector 116 and generates comparison data in preparation for transmission to and rendering on user interface 103A and/or 103B.

The frontend interface 118 manages interactions between the clients 102A, 102B and the ML application 104. In one or more embodiments, frontend interface 118 refers to hardware and/or software configured to facilitate communications between a user and the clients 102A, 102B and/or the machine learning application 104. In some embodiments, frontend interface 118 is a presentation tier in a multitier application. Frontend interface 118 may process requests received from clients and translate results from other application tiers into a format that may be understood or processed by the clients.

For example, one or both of the client 102A, 102B may submit requests to the ML application 104 via the frontend interface 118 to perform various functions, such as for labeling training data and/or analyzing target data. In some examples, one or both of the clients 102A, 102B may submit requests to the ML application 104 via the frontend interface 118 to view a graphic user interface related to analysis of a schema. In still further examples, the frontend interface 118 may receive user input that re-orders individual interface elements.

Frontend interface 118 refers to hardware and/or software that may be configured to render user interface elements and receive input via user interface elements. For example, frontend interface 118 may generate webpages and/or other graphical user interface (GUI) objects, such as those associated with user interfaces 103A, 103B. Client applications, such as web browsers, may access and render interactive displays in accordance with protocols of the internet protocol (IP) suite. Additionally or alternatively, frontend interface 118 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In an embodiment, different components of the frontend interface 118 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the frontend interface 118 is specified in one or more other languages, such as Java, C, or C++.

The action interface 120 may include an API, CLI, or other interfaces for invoking functions to execute actions. One or more of these functions may be provided through cloud services or other applications, which may be external to the machine learning application 104. For example, one or more components of machine learning application 104 may invoke an API to access information stored in a data repository (e.g., data repository 126) for use as a training corpus for the machine learning engine 104 and/or for analysis as data for a target measurement period and/or as a baseline measurement period. It will be appreciated that the actions that are performed may vary from implementation to implementation.

In some embodiments, the machine learning application 104 may access external resources 132, such as cloud services and/or computing systems as well as "external" computer systems that are associated with a proprietary network or private domain that is separate from the network that hosts the system 100. Example cloud services may include, but are not limited to, social media platforms, email services, short messaging services, enterprise management systems, and other cloud applications. Action interface 120 may serve as an API endpoint for invoking a cloud service. For example, action interface 120 may generate outbound requests that conform to protocols ingestible by external resources.

Additional embodiments and/or examples relating to computer networks are described below in Section 5, titled "Computer Networks and Cloud Networks."

Action interface 120 may process and translate inbound requests to allow for further processing by other components of the machine learning application 104. The action interface 120 may store, negotiate, and/or otherwise manage authentication information for accessing external resources. Example authentication information may include, but is not limited to, digital certificates, cryptographic keys, usernames, and passwords. Action interface 120 may include authentication information in the requests to invoke functions provided through external resources.

In one or more embodiments, data repository 124 may be any type of storage unit and/or device (e.g., a file system, database, collection of tables, or any other storage mechanism) for storing data. Further, data repository 124 may include multiple different storage units and/or devices. The multiple different storage units and/or devices may or may not be of the same type or located at the same physical site. Further, data repository 124 may be implemented or may execute on the same computing system as the ML application 104. Alternatively or additionally, data repository 124 may be implemented or executed on a computing system separate from the ML application 104. Data repository 124 may be communicatively coupled to the ML application 104 via a direct connection or via a network.

In the embodiment illustrated in FIG. 1, the data repository 124 includes a specific data store for operational parameter data 126. For example, the system 100 may detect operational data from the Type A computing resource 134 and the Type B computing resource 138 (e.g., via operation of the monitoring engine 114). Once detected, elements of the system 100 may prepare the detected data so that the data are stored in an appropriate data structure (e.g., a table) with any associated metadata that the system may use for executing the operations of the method 200. For example, the system may store an identifier of the originating computing device, its associated type, and the data on which the data were generated as metadata associated with the data structure. Some of these metadata may be stored as keys for use in a relational database.

Information related to target data items and the training data may be implemented across any of components within the system 100. However, this information may be stored in the operational parameters store 126 for purposes of clarity and explanation.

Type A computing resource 134 and Type B computing resource 138 may be computing resources that include computing hardware, computing software (e.g., binary code, executable code configured to carry out computations and/or instructions), and combinations thereof. For example, a computing resource may be a database that is executed on one or more storage servers. In another example, a computing resource may include a database and the underlying host on which the database is executed. In still another example, a computing resource may include not only the database and its underlying host, but also the management software and network bandwidth allocated or associated with the database and its host.

The different types (A and B) of the computing resources reflect the heterogeneity of the computing environments in which computing resources may be situated. For illustration, the type A computing resource 134 may be an on-premises database and/or server associated with a proprietary network and/or domain that is distinct from the network 100. In contrast, the type B computing resource 138 may be associated with a distributed, or "cloud," computing network.

The form, type, and/or format of the management data collected from these different types of networks may be different. In some examples, the ML application 104 may convert one or both of the data from these different network types into a common and/or comparable format. For example, an on-premises computing resource may measure productivity in terms of a proportion of the associated underlying physical resources that are available (e.g., CPU cycles, memory storage capacity) whereas cloud-based systems may measure productivity in terms of a percentage of contracted resources per billing cycle or units of time. Regardless of the different parameters and/or units of measurement used, the system 100 may convert one or both of the computing resource 134, 138 data into terms that are comparable.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Composite Display Generation and Baseline Measurement Period Selection

FIG. 2 illustrates an example set of operations, collectively referred to as a method 200, for generating and/or updating a composite display that displays data associated with operational parameters of each of at least two computing resources, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

Before presenting the details of the method 200, a high-level description of the method is that its embodiments generate a composite display of operational parameters for multiple computing resources. The system executing the method 200 quantifies and/or detects operational parameters from multiple different computing resources. The operational parameters may be associated with a target measurement period to be analyzed. The system then receives a selection of a baseline measurement period to which the operational data from the target measurement period may be compared. The system may then render or otherwise display, in a first interface element, the data from the target measurement period and the baseline measurement period that correspond to a first computing resource. Analogously, the system may also render or otherwise display, in a second interface element, data from the target measurement period and the baseline measurement period that correspond to a second computing resource. In this way, a system may present data corresponding to operational parameters for different computing resources, even though in distinct computing environments (e.g., on-premises vs. cloud), in different elements of a common ("composite") user interface.

In some examples, the system may receive a selection of a second baseline measurement period. In this case, the system updates the first interface element of the composite display by displaying data corresponding to the operational parameters for the first computing resource during the target measurement period and the second baseline measurement period. Analogously, the system may also update the second interface element of the composite display by displaying data corresponding to the operational parameters for the second computing resource during the target measurement period and the second baseline measurement period.

An embodiment may also execute the operations described above, except that the system executing the method 200 itself identifies a baseline measurement period. For example, the system may identify selection criteria by which the system selects a baseline measurement period. In some examples, the system may select a static baseline measurement period that is measured relative to the target measurement period. In one illustration, the baseline measurement period is a defined period of time (e.g., 24 hours, 1 week) preceding the target measurement period. In another example, the system identifies a baseline measurement period based on a similarity to the target measurement period. For example, the system may detect parameters during the target measurement period such as workload, number of transactions per unit time, types of transactions (and optionally their relative proportions), the applications or types of applications being invoked, and identify a prior period with a similar set of parameters. In still another example, the system may identify a baseline measurement period based on a periodic event that also corresponds to the target measurement period. In one illustration, this may include a season, an end of a quarter, an end of a financial year, and similar periodic events that are shared by the target measurement period and baseline measurement period.

The method 200 may begin by the system quantifying operational parameters for selected individual computing resources. For example, the system may directly maintain, operate, and/or communicate with computing resource measurement and management systems. These measurements and/or management systems may monitor, in real time, various operational parameters associated with the computing resources. In some examples, the measurement and/or management systems may include sensors that measure a number of central processing unit (CPU) cycles per unit time that are associated with or allocated to each of the computing resources, a transaction execution throughput, average transaction execution time, utilized storage capacity, a number of calls per unit time, among other operational parameters.

In some embodiments, the system may receive raw operational data and process it into a form that quantifies operational parameters of interest. For example, the system may be in communication with one or both of a test access point (TAP) or a switch port analyzer (SPAN) that mirror transmitted network packets to a system analyzer (e.g., the system 100). In some examples, a system analyzer may perform a deep packet inspection or metadata inspection of the mirrored packets. Via one or both of these inspections, the system determines the operational performance parameter(s) indicated by the packets and then quantifies the indicated operational parameter.

In some examples the system may maintain data structures, such as counters, tables, or other data structures that accumulate occurrences of events that measure various operational parameters. For example, the system may maintain a counter data structure for a particular database that increments a counter each time a deep packet inspection (or other analytical technique) detects a call to the particular database. The system may maintain separate counters for each incremental measurement period (e.g., per second, per minute, per hour). These separate counters may be analyzed cumulatively to determine a baseline operational performance for any baseline measurement time period (described below) selected by a user or by the system.

In some examples, the system may receive data associated with operational resources from, for example, management systems that directly monitor the function of the computing resources. In one example, a server on which a database (or a portion of a database, or multiple databases) is executing may monitor the CPU capacity utilization, the memory storage utilization, and/or communication bandwidth consumption by the database. The server (or other underlying hardware on which the database relies for execution) may transmit these data to the system for storage (in a data structure, as described above) and for execution of the operation 204 (among other operations of the method 200).

In another example, database management software may monitor a number of calls per unit time, an average execution time, or other operational parameter directly related to the internal operations of the database itself. The database management software may transmit these data to the system for storage (in a data structure, as described above) and for execution of the method 200, including the operation 204.

In still other examples, the system may collect clickstream data as it relates to the operation of computing resources. While the system may use any one or more of the data structures described above to store this type of data (or similar type of data related to transaction frequency and transaction type), in some examples the system may store the clickstream data in a Kafka event record.

Regardless of the type of data, the means by which the data is obtained and transmitted to the system, or the data structure in which the system stores the data, the system obtains data that quantifies (or can be used to quantify) one or more operational parameters for any number of computing resources.

The system then identifies a target measurement period in preparation for comparing one or more operational parameters for one or more computing resources to a reference, or "baseline" measurement period (operation 208). In some examples, the target measurement period may be one or more fixed time periods that are measured from an origin that is the time of execution of the method 200. That is, upon initiating the method 200, a target measurement period may extend back in time from the time of initiating the method 200. For illustration purposes, examples of fixed measurement periods may include the most recent 24 hours, the most recent 48 hours, the past week/month/quarter, and the like.

In other examples, the target measurement period may be measured in another unit of measurement instead of time. For example, the target measurement period may be selected in terms of processor cycles, a number of total transactions executed by the computing resource, a number of additional bits of storage added to a storage media, or the like. Regardless of the unit of measure used to select the target measurement period, these intervals may be uniform in some examples.

In one illustration, whether by user instruction or system-initiated action, the target measurement period may start at a selected historical (or "prior") point that precedes the current time of execution of the method 200. For example, the operation 208 may select as the origin of the target measurement period the prior day, the prior quarter, or any other start time. The time period after this origin may be selected according to any of the criteria described above.

Regardless of how the target measurement period is selected, the system then may receive a selection of a baseline measurement period (operation 212). The baseline measurement period is a period that acts as a reference to which the target measurement period is compared. At a high level, the system acquires operational performance data from the baseline measurement period that is associated with the computing resource(s) being analyzed. In this way, the data associated with the target measurement period may be compared to data from the baseline measurement period. This comparison may be used to determine performance of the analyzed computing resources relative to the baseline measurement period.

In some examples, the baseline measurement period may be prescribed by the system as fixed time periods and/or fixed intervals. For example, the system may generate a user interface that permits a user to select between baseline measurement periods of the prior 24 hours, the prior 48 hours, a time duration equal to the target measurement period from the same time of day, week, month, quarter, and/or season of a prior day, week, month, quarter, and/or season. For example, if a target measurement period is between 2 am and 4 am on Tuesday of the second week of September in year number 2, the system may permit selection from baseline measurement periods of between: (a) 2 am and 4 am of the first week of September in year number 2 (i.e., same day/time/month of the prior week); (b) 2 am and 4 am of the second week of September in year number 1 (i.e., same day/time/month/week of the prior year); (c) 2 am and 4 am of the second week of August in year number 2 (i.e., same day/time/week/year of the prior month); and/or 2 am and 4 am of the second week of June in year number 2 (i.e., same day/time/week/year of the prior calendar quarter). These are for illustration purposes only and other variations will be apparent upon appreciation of the various embodiments described herein.

In some examples, the baseline measurement period may be a period that is prescribed as relevant to the target measurement period. The system may determine one or more candidate baseline periods (and select one or allow a user to select one) using a trained ML model. A trained ML model may identify one or more baseline measurement periods that are similar to the target measurement period (e.g., similar workloads) and select one of them to use as the basis of comparison to the target measurement period. In one illustration, the system may generate one or more baseline measurement periods for comparison to a particular target measurement period selected in the operation 208.

For example, the system may receive the selected target measurement period in the operation 208 and then analyze the various attributes and/or characteristics associated with data from the target measurement period. This analysis and comparison may be executed using a trained ML model. For example, the system may identify a frequency of one or more types of transactions executed during the target measurement period, a workload (e.g., a number of transactions per unit time independent of the transaction type), identities of devices/device types/domains requesting data transactions, identities of data sources accessed, and the like. Some or all of these characteristics and/or attributes of the target measurement period may be represented as a feature vector.

The system may then use the target measurement period feature vector to identify a baseline measurement period that has similar characteristics to the target measurement period. For example, the system may generate one or more feature vectors that represent characteristics and/or attributes of a set of baseline measurement periods. The system may then execute a similarity analysis (e.g., cosine similarity) to determine whether any one or more of the baseline measurement periods have a similarity value relative to the target measurement period that is above a threshold value. In some examples, this similarity analysis generates a set of candidate baseline measurement periods. The system, in some embodiments, may then select a baseline measurement period from the set of candidates based on any one or more similarity criteria. In some examples, the system selects the baseline measurement period with the highest similarity value (above the threshold) to the target measurement period. In other examples, the system may weight some attributes over others so that baseline measurement periods with higher values of the weighted attributes are favored in the determination of the baseline measurement period.

Upon the system selecting, identifying, and/or receiving a selection of both the target measurement period and the baseline measurement period, the system then renders these comparisons for display (operation 216). More specifically, the above operations may be executed on different computing resources and the comparison between data from their respective target and baseline measurement periods rendered in separate interface elements of a composite display. This aspect of the method 200 can be applied in any situation in which contemporaneous monitoring and/or management of computing resources is desired.

This aspect of the method 200 may even be applied to computing resources in distinct computing environments. More specifically, the system may render, in a first interface element of the composite display, data corresponding to operational parameters for a first computing resource (operation 218) and render, in a second interface element of the composite display, data corresponding to operational parameters for a second computing resource (operation 220).

For example, the system may render data corresponding to operational parameters of a computing resource in a distributed (cloud) computing environment in a first interface element (operation 218) at the same time as data corresponding to operational parameters of a computing resource in an on-premises computing environment in a second interface element (operation 220). By simultaneously displaying distinct computing resource data in separate elements of a composite display, the system may improve the management of diverse computing resources and resource types. For example, a particular database may execute on both cloud-based and on-premises computing resources (e.g., servers, networks). Upon executing the operation 216 (and sub-operations 218 and 220), the system may contemporaneously display data associated with (or representing) these diverse computing resources regardless of their resource type or computing environment. This in turn enables a comprehensive view of operational performance of computing resources, particularly for distinct computing resources that may be in communication with one another and/or are logically related to one another but nevertheless distinct and/or operating in distinct computing environments.

The method 200 may continue upon the system receiving a selection of a second baseline measurement period (operation 222). In one example, as described below in more detail in the context of FIGS. 3, 4A, 4B, 5A, and 5B, the system may provide one or more pre-determined or static baseline measurement periods for selection. Illustrations of this example include a dropdown menu (or other similar interface element used for selection) that present one or more baseline measurement period selections that do not change over time or between resources. These "static" selections may include "last 24 hours," "last 48 hours," or any of the other options described above.

In another example, the system may generate a selection of the second baseline measurement period (operation 222). In one illustration of this example, the system uses a trained machine learning model to identify one or more baseline measurement periods against which the target measurement period can be compared. As described above in the context of the operation 212, a trained ML model may generate a characterization of the target measurement period and identify one or more baseline measurement periods based on a similarity score (e.g., above a minimum threshold value).

The system may update the composite display upon selecting the second baseline measurement period and rendering the corresponding baseline measurement period data in updated interface elements with the data corresponding to the target measurement period (operation 224). This updating process is illustrated in FIG. 2 as executed in two operations analogous to those described above in the context of the operations 218 and 220. Specifically, the first interface element associated with the first computing resource is updated with a new dataset that corresponds to the target measurement period and the second baseline measurement period (operation 228). Similarly, the second interface element associated with the second computing resource is updated with a new dataset that corresponds to the target measurement period and the second baseline measurement period (operation 228).

These operations demonstrate the flexibility, convenience, and analytical benefits of the method 200.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Some elements of FIGS. 3, 4A, 4B, 5A, and 5B are presented in the context of database analysis. The characterization of databases in these examples is for convenience of description and it will be appreciated that other types of computing resources, such as computing resources distributed between different computing resource environments (on-premises, cloud-based) may be characterized using variations of these example interface elements.

Figure 3A:
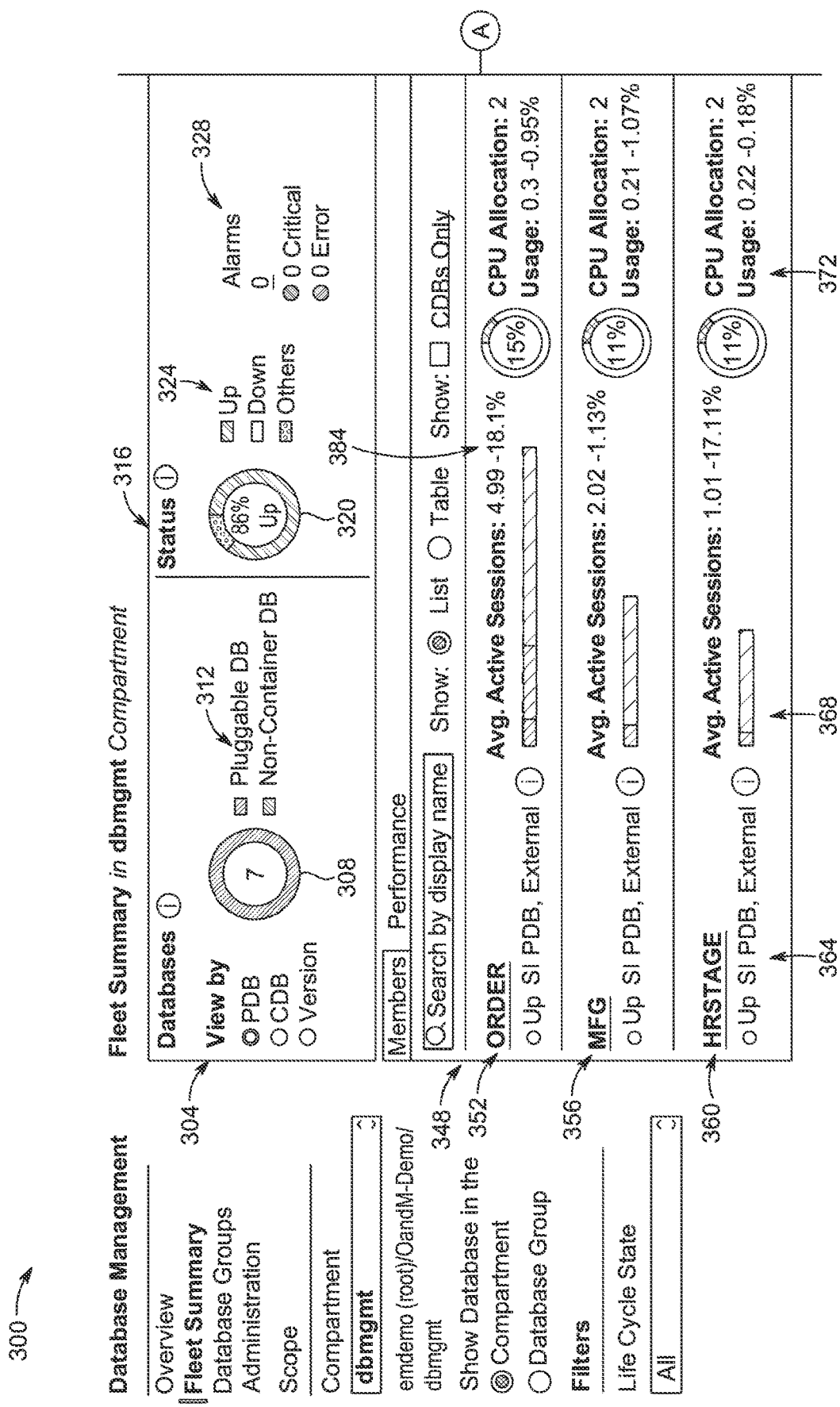
FIGS. 3A and 3B illustrate an example composite display in accordance with one or more embodiments.
Figure 3B:
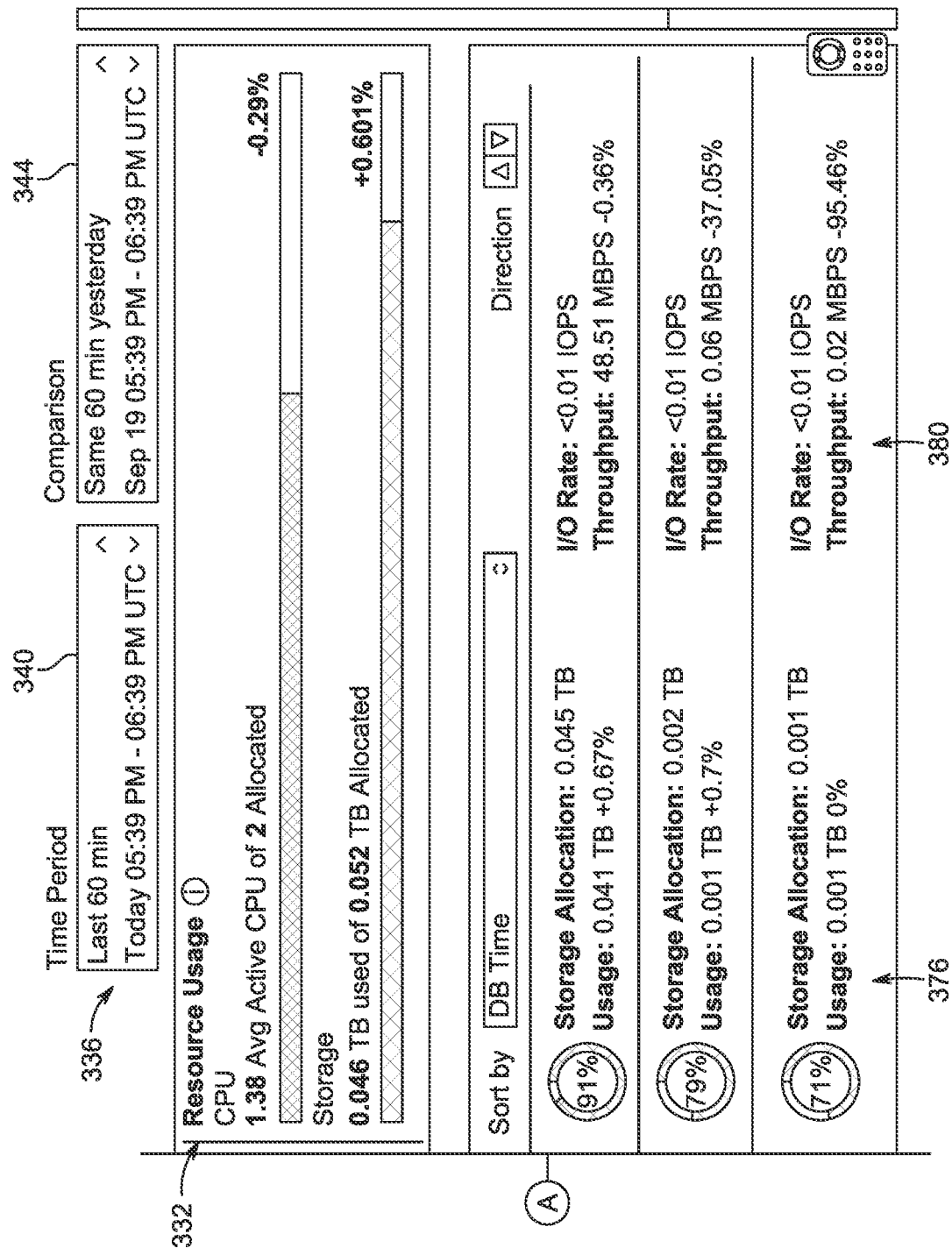

FIGS. 3A and 3B illustrate elements of an example composite interface 300 according to one or more embodiments. In this illustration, the example composite user interface 300 includes various user interface elements with which to monitor computing resource performance, select target measurement periods, and select baseline measurement periods. Various elements of the example composite user interface 300 are separated between the FIGS. 3A and 3B for clarity and convenience of depiction. It will be appreciated that some or all of the features divided between these two figures may appear in a single interface in some embodiments.

At a high level, the example composite user interface 300 includes at a top of the interface 300 a band of individual elements presenting fleet-wide characterizations of the performance of a group (or "fleet") of computing resources, which in this case are databases.

In this band of high level performance interface elements, for example, the interface element 304 presents a graphical display that shows relative proportions of different types of databases within a "fleet" of databases. This fleet is monitored by the system that generates the example composite user interface 300. The monitoring system generating the user interface 300 may optionally execute the method 200 or be in communication with a system that executes the method 200.

In this example, the interface element 304 graphically presents the proportions of "pluggable databases" relative to "non-container databases." As indicated above, the interface element 304 may, in other embodiments, illustrate the distinctions between cloud-based and on-premises computing resources, server types, and the like.

The interface element 304 includes a graph 308 illustrating the total number of databases and the relative proportions of databases of the different types of quantified types of databases. The different types of quantified types of databases are indicated in a legend 312.

Another high-level characterization of fleet-wide performance is presented in the interface element 316, which illustrates a status of the fleet of databases indicated in the interface element 304. More specifically, the relative proportions of databases having different measured statuses ("up," "down," "other") is shown in graph 320. Legend 324 defines the meaning of the different patterns depicted in the graph. Furthermore, a number and severity of alarms, triggered by an operational parameter exceeding an upper or lower alarm limit, are indicated in the alarm indicator element 328.

A fleet-wide characterization is shown in interface element 332, which identifies fleet resource usage, in this case CPU usage and storage usage. Other types of resources and the proportion (or quantity) consumed may be presented in the interface element 332 depending on the fleet of computing resources that are monitored.

Interface section 336 provides selectors 340 and 344. The interface section 336 provides the capability for a user to select a target measurement period and a baseline measurement period. Selector 340 enables selection of a target measurement period via a drop-down menu. Selector 344 enables selection of a baseline measurement period for comparison to the target measurement period via a drop-down menu. These are described in more detail in FIGS. 4A, 4B, 5A, and 5B.

The interface section 348 provides a more granular view of the individual computing resources that compose the fleet whose high-level performance characteristics are illustrated in the interface elements 304, 316, and 332.

Specifically, individual computing resources that collectively form the monitored fleet appear in row interface elements 352, 356, and 360. In this case, the individual databases shown as components of the fleet are "ORDER" (row interface element 352), "MFG" (row interface element 356), and "HRSTAGE" (row interface element 360).

Each row includes specific information relating to the performance of that particular individual computing resource. The different types of specific information are aligned as columns 364, 368, 372, 376, and 380. Column 364 is a summary of the specific resource. This summary includes the resource name (e.g., "order"), its status (e.g., "up"), and its type (e.g., external pluggable database). Column 368 illustrates an operational performance parameter, which in this case is a number of active sessions. Element 384 in the column 368 also includes a quantification of the current operational performance (in addition the graphical depiction) and well as a numerical change of the operational performance parameter relative to the baseline period selected via interface element 344. This feature is described below in more detail.

Columns 372, 376, and 380 illustrate additional operational performance parameters that are specific to the computing resources of their corresponding rows. In the examples shown, the operational performance parameters are "CPU allocation," "Storage Allocation," and "I/O Rate." Each of these columns not only presents a quantification of the current operational level but also a change relative to the same operational parameter value in the baseline measurement period selected by the interface element 344.

FIGS. 4A and 4B illustrate a row interface element and the measurement period selector in more detail. Specifically, FIG. 4A presents interface element 352 and FIG. 4B presents interface element 336.

Turning first to FIG. 4A, the interface element 352 includes a target/measurement baseline selector 336 (described in more detail in FIG. 4B) and an interface element 352. The interface element 352 includes a column 406 which identifies the monitored resource by name ("ORDER"), its operational status ("up"), and its resource type (external pluggable database). These specifics will change depending on the type of resource that is monitored.

The sub-element 408 presents a graphical depiction of an operational parameter, in this case a number of active sessions. The sub-element 408 in this example is a stacked bar chart that presents sub-types of the number of active sessions. For example, the number of active sessions may be divided into sub-types, the relative proportions of which are shown in the stacked bar chart of sub-element 408.

Also shown adjacent to the bar chart of sub-element 408 are two numerical displays 412, 416. The numerical display 412 displays a current numerical quantification of the number of active sessions where numerical display 416 presents a change in the current number of active sessions relative to the baseline measurement period. As described above in the context of FIG. 2, and below in the context of FIG. 4B, the value shown in the numerical display 416 may change depending on one or both of the particular target measurement period and baseline measurement period selected.

The remaining fields of the interface element 352 include elements that are analogous to sub-element 408, numerical display 412, and numerical display 416. For example, the sub-element 420 shows a current used percentage of CPU capacity allocated to the ORDER database, where numerical display 424 shows a current activity level and numerical display 424 shows that the current activity level is 17.07% lower than the activity level during a selected baseline measurement period.

Sub-element 436 graphically shows the percentage of storage capacity allocated to the ORDER database that is utilized. The numerical display 440 show the current value of storage capacity utilized and numerical display 444 show the change in utilized capacity relative to a selected baseline measurement period.

Sub-element 448 graphically shows an input/output (I/O) rate associated with transactions submitted to and fulfilled by the ORDER database. The numerical display 452 shows the current value of transaction throughput and numerical display 456 shows the change in I/O rate relative to a selected baseline measurement period.

FIG. 4B presents a more detailed view of interface selector 336. The interface selector 336 includes a selector for a target measurement period 402 and a selector for a baseline measurement period 404 (in this example labeled "comparison"). More specifically, the selector 404 has two options: "last 24-48 hours" in selector element 460 and "same 24 hours last week" 464. In this example, the options presented in the selectors 460 and 464 may be persistent regardless of the data characteristics identified in the data in the target measurement period. In some examples, the persistent baseline measurement periods in selectors 460, 464 may be presented based on the assumption that these time periods are relevant to the target measurement period selected by target measurement period selector 402.

Figure 5A:
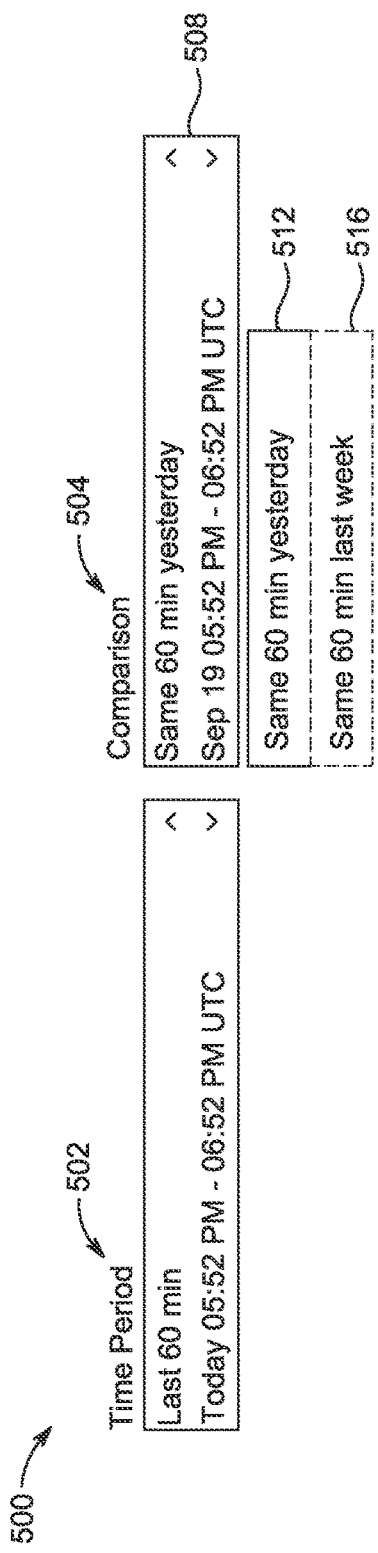
FIGS. 5A and 5B illustrates specific features of an example composite display including interface elements for selecting a baseline measurement period and a target measurement period in accordance with one or more embodiments.

FIG. 5A illustrates an interface selector 500 that is analogous to the interface selector 336 except for this time periods presented. In this example, the target measurement period selected in selector 502 is "last 60 minutes." The baseline measurement period selector 504 show a selection of "same 60 min yesterday." The options presented in the selector include the selected baseline measurement in option 512 as well as "same 60 min last week" in option 516.

Figure 5B:
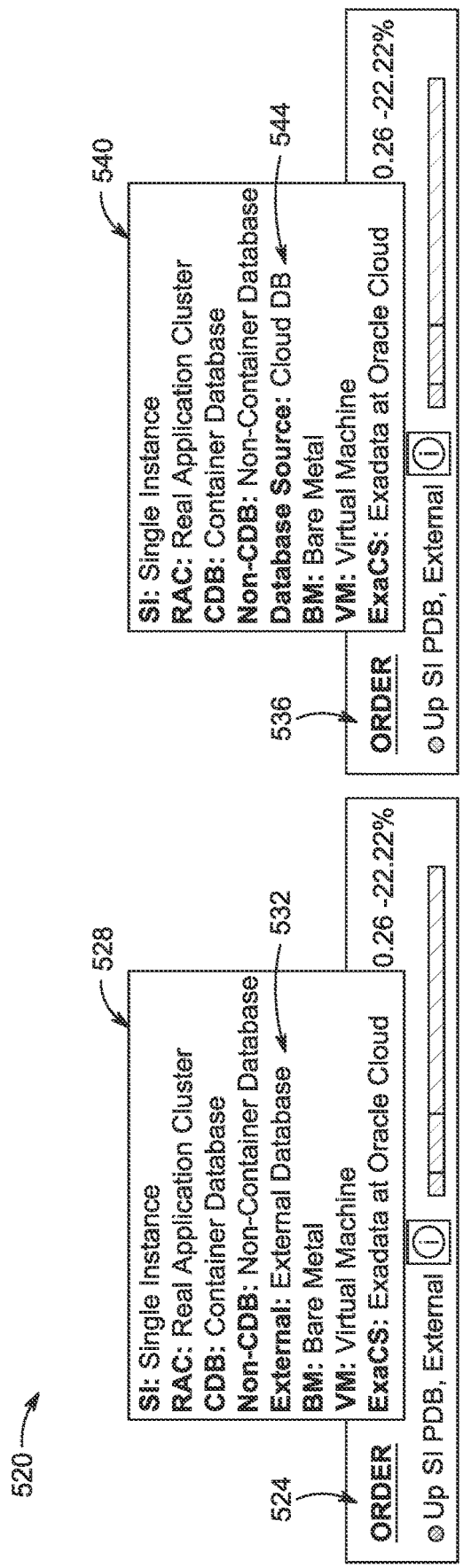

FIG. 5B illustrates one interface element 520 in which two portions of a same database are shown in separate interface elements because one portion of the database is an "external" or "on-premises" database and another portion of the database is stored and operated within a cloud-based architecture. In this example, the interface element row element 524 displays detailed information pop-up interface element 528 that identifies the portion of the "ORDER" database operating as an external database in line 532. Analogously, the interface element row element 536 displays detailed information pop-up interface element 540 that identifies a portion of the "ORDER" database operating as cloud database in line 544.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
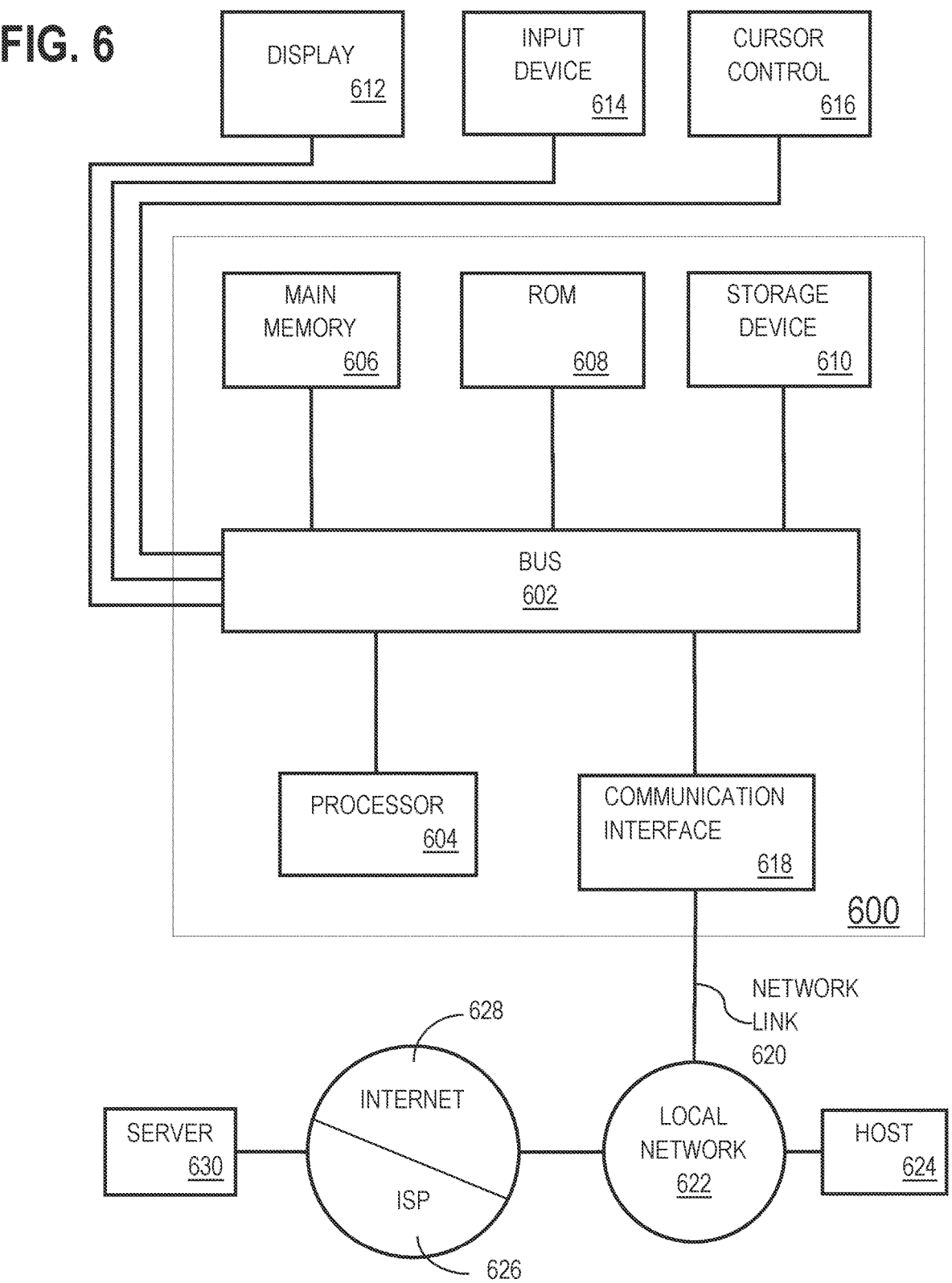
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:

receiving a plurality of operational parameters for a plurality computing resources associated with a plurality of operational environments, wherein:
- the plurality of operational environments comprise a first operational environment and a second operational environment different from the first operational environment,
- the plurality of computing resources comprise a first computing resource associated with the first operational environment and the second computing resource associated with the second operational environment, and
- the plurality of computing resources comprise one or more of the following: computing hardware, computing software, and combinations of computing hardware and computing software;

generating a composite display comprising the plurality of operational parameters for each of the plurality of computing resources, the generating comprising:
- quantifying the plurality of operational parameters for the first computing resource and the second computing resource; and
- identifying a target measurement period for comparison of the plurality of operational parameters, identifying a candidate set of baseline measurement periods by evaluating a plurality of prior measurement periods in view of the plurality of operational parameters for the target measurement period;

displaying, via the composite display, the candidate set of baseline measurement periods;

receiving, from a user via the composite display, a selection of a first baseline measurement period for the candidate set of baseline measurement periods;

concurrently rendering in the composite display:
- (a) a first interface element comparing the plurality of operational parameters for the first computing resource during the target measurement period relative to the first baseline measurement period, the first interface element comprising a first set of data corresponding to the plurality of operational parameters for the first computing resource during the target measurement period and the first baseline measurement period; and
- (b) a second interface element comparing the plurality of operational parameters for the second computing resource during the target measurement period relative to the first baseline measurement period, the second interface element comprising a second set of data corresponding to the plurality of operational parameters for the second computing resource during the target measurement period and the first baseline measurement period;

receiving, from the user via the composite display, a selection of a second baseline measurement period different from the first baseline measurement period; and updating the composite display at least by concurrently rendering in the composite display:
- (a) the first interface element comparing the plurality of operational parameters for the first computing resource during the target measurement period relative to the second baseline measurement period, the first interface element comprising a third set of data corresponding to the plurality of operational parameters for the first computing resource during the target measurement period and the second baseline measurement period; and
- (b) the second interface element comparing the plurality of operational parameters for the second computing resource during the target measurement period relative to the second baseline measurement period, the second interface element comprising a fourth set of data corresponding to the plurality of operational parameters for the second computing resource during the target measurement period and the second baseline measurement period, wherein:
- the first baseline measurement period comprises a first time frame of a calendar,
- the target measurement period comprises a second time frame of the calendar that is different than the first time frame of the calendar,
- a first duration of the first time frame matches a second duration of the second time frame,
- the second baseline measurement period comprises a third time frame of the calendar that is different from the second time frame of the calendar, and
- a third duration of the third time frame matches the second duration of the second time frame.

2. The one or more non-transitory computer-readable media of claim 1, further comprising:
displaying the candidate set of baseline measurement periods, wherein the first baseline measurement period is selected from the candidate set of baseline measurement periods.

3. The one or more non-transitory computer-readable media of claim 1, wherein the evaluating operation comprises:
applying a trained machine learning model to determine a plurality of similarity scores between the target measurement period and each prior measurement period of the plurality of prior measurement periods; and
selecting the candidate set of baseline measurement periods based on a subset of similarity scores in the plurality of similarity scores above a threshold similarity value.

4. The one or more non-transitory computer-readable media of claim 1, wherein the evaluating operation comprises comparing the operational parameters for the target measurement period to the operational parameters for each of the prior measurement periods to identify a system selected baseline measurement period.

5. The one or more non-transitory computer-readable media of claim 1, wherein the target measurement period comprises a first starting point, and the first baseline measurement period comprises a second starting point different from the first starting point.

6. The one or more non-transitory computer-readable media of claim 1, wherein the target measurement period is based on a first iteration of a periodic event and the first baseline measurement period is based on an additional iteration of the periodic event occurring after the first iteration of the periodic event.

7. The one or more non-transitory computer-readable media of claim 1, wherein the plurality of computing resources comprises a first portion associated with a distributed computing network and a second portion associated with a proprietary computing network.

8. The one or more non-transitory computer-readable media of claim 7, wherein the plurality of computing resources comprises a plurality of databases.

9. The one or more non-transitory computer-readable media of claim 7, wherein:
the plurality of operational parameters comprises (1) a first subset of operational parameters associated with distributed computing network operations and (2) a second subset of operational parameters different from the first subset of operational parameters associated with proprietary computing network operations; and
prior to the concurrently rendering operation, transforming one or both of the first subset and the second subset to enable direct comparison of the first subset of operational parameters to the second subset of operational parameters.

10. The one or more non-transitory computer-readable media of claim 1, wherein the first operational environment comprises a heterogeneous computing environment including a cloud computing environment and a local computing environment.

11. The one or more non-transitory computer-readable media of claim 1, wherein:
receiving the plurality of operational parameters comprises converting the plurality of operational parameters for the plurality computing resources into a common data format; and
concurrently rendering in the composite display comprises presenting the plurality of operational parameters for the first computing resource and the plurality of operational parameters for the second computing resource in the common data format.

12. The one or more non-transitory computer-readable media of claim 11, wherein the common data format comprises a first unit of measure of a plurality of plurality of units of measure.

13. A method comprising:
receiving a plurality of operational parameters for a plurality computing resources associated with a plurality of operational environments, wherein:
the plurality of operational environments comprise a first operational environment and a second operational environment different from the first operational environment,
the plurality of computing resources comprise a first computing resource associated with the first operational environment and the second computing resource associated with the second operational environment, and
the plurality of computing resources comprise one or more of the following: computing hardware, computing software, and combinations of computing hardware and computing software;
generating a composite display comprising the plurality of operational parameters for each of the plurality of computing resources, the generating comprising:
quantifying the plurality of operational parameters for the first computing resource and the second computing resource; and
identifying a target measurement period for comparison of the plurality of operational parameters,
identifying a candidate set of baseline measurement periods by evaluating a plurality of prior measurement periods in view of the plurality of operational parameters for the target measurement period;
displaying, via the composite display, the candidate set of baseline measurement periods;
receiving, from a user via the composite display, a selection of a first baseline measurement period for the candidate set of baseline measurement periods;
concurrently rendering in the composite display:
(a) a first interface element comparing the plurality of operational parameters for the first computing resource during the target measurement period relative to the first baseline measurement period, the first interface element comprising a first set of data corresponding to the plurality of operational parameters for the first computing resource during the target measurement period and the first baseline measurement period; and
(b) a second interface element comparing the plurality of operational parameters for the second computing resource during the target measurement period relative to the first baseline measurement period, the second interface element comprising a second set of data corresponding to the plurality of operational parameters for the second computing resource during the target measurement period and the first baseline measurement period;
receiving, from the user via the composite display, a selection of a second baseline measurement period different from the first baseline measurement period; and
updating the composite display at least by concurrently rendering in the composite display:
(a) the first interface element comparing the plurality of operational parameters for the first computing resource during the target measurement period relative to the second baseline measurement period, the first interface element comprising a third set of data corresponding to the plurality of operational parameters for the first computing resource during the target measurement period and the second baseline measurement period; and
(b) the second interface element comparing the plurality of operational parameters for the second computing resource during the target measurement period relative to the second baseline measurement period, the second interface element comprising a fourth set of data corresponding to the plurality of operational parameters for the second computing resource during the target measurement period and the second baseline measurement period,
wherein:
the first baseline measurement period comprises a first time frame of a calendar,
the target measurement period comprises a second time frame of the calendar that is different than the first time frame of the calendar,
a first duration of the first time frame matches a second duration of the second time frame,
the second baseline measurement period comprises a third time frame of the calendar that is different from the second time frame of the calendar, and
a third duration of the third time frame matches the second duration of the second time frame.

14. The method of claim 13, further comprising:
displaying the candidate set of baseline measurement periods, wherein the first baseline measurement period is selected from the candidate set of baseline measurement periods.

15. The method of claim 13, wherein the evaluating comprises:
applying a trained machine learning model to determine a plurality of similarity scores between the target measurement period and each prior measurement period of the plurality of prior measurement periods; and selecting the candidate set of baseline measurement periods based on a subset of similarity scores in the plurality of similarity scores above a threshold similarity value.

16. The method of claim 13, wherein the evaluating comprises comparing the operational parameters for the target measurement period to the operational parameters for each of the prior measurement periods to identify a system selected baseline measurement period.

17. The method of claim 13, wherein the target measurement period comprises a first starting point and the first baseline measurement period comprises a second starting point different from the first starting point.

18. The method of claim 13, wherein the target measurement period is based on a first iteration of a periodic event and the first baseline measurement period is based on an additional iteration of the periodic event occurring after the first iteration of the periodic event.

19. The method of claim 13, wherein the plurality of computing resources comprises a first portion associated with a distributed computing network and a second portion associated with a proprietary computing network.

20. The method of claim 19, wherein the plurality of computing resources comprises a plurality of databases.

21. The method of claim 19, wherein:
the plurality of operational parameters comprises (1) a first subset of operational parameters associated with distributed computing network operations and (2) a second subset of operational parameters different from the first subset of operational parameters associated with proprietary computing network operations; and
prior to the concurrently rendering, transforming one or both of the first subset and the second subset to enable direct comparison of the first subset of operational parameters to the second subset of operational parameters.

22. A system comprising:
at least one device including a hardware processor;
the system being configured to perform operations comprising:
receiving a plurality of operational parameters for a plurality computing resources associated with a plurality of operational environments, wherein:
the plurality of operational environments comprise a first operational environment and a second operational environment different from the first operational environment,
the plurality of computing resources comprise a first computing resource associated with the first operational environment and the second computing resource associated with the second operational environment, and
the plurality of computing resources comprise one or more of the following: computing hardware, computing software, and combinations of computing hardware and computing software;
generating a composite display comprising the plurality of operational parameters for each of the plurality of computing resources, the generating comprising:
quantifying the plurality of operational parameters for the first computing resource and the second computing; and
identifying a target measurement period for comparison of the plurality of operational parameters,
identifying a candidate set of baseline measurement periods by evaluating a plurality of prior measurement periods in view of the plurality of operational parameters for the target measurement period;
displaying, via the composite display, the candidate set of baseline measurement periods;
receiving, from a user via the composite display, a selection of a first baseline measurement period for the candidate set of baseline measurement periods;
concurrently rendering in the composite display:
(a) a first interface element comparing the plurality of operational parameters for the first computing resource during the target measurement period relative to the first baseline measurement period, the first interface element comprising a first set of data corresponding to the plurality of operational parameters for the first computing resource during the target measurement period and the first baseline measurement period; and
(b) a second interface element comparing the plurality of operational parameters for the second computing resource during the target measurement period relative to the first baseline measurement period, the second interface element comprising a second set of data corresponding to the plurality of operational parameters for the second computing resource during the target measurement period and the first baseline measurement period;
receiving, from the user via the composite display, a selection of a second baseline measurement period different from the first baseline measurement period; and
updating the composite display at least by concurrently rendering in the composite display:
(a) the first interface element comparing the plurality of operational parameters for the first computing resource during the target measurement period relative to the second baseline measurement period, the first interface element comprising a third set of data corresponding to the plurality of operational parameters for the first computing resource during the target measurement period and the second baseline measurement period; and
(b) the second interface element comparing the plurality of operational parameters for the second computing resource during the target measurement period relative to the second baseline measurement period, the second interface element comprising a fourth set of data corresponding to the plurality of operational parameters for the second computing resource during the target measurement period and the second baseline measurement period,
wherein:
the first baseline measurement period comprises a first time frame of a calendar,
the target measurement period comprises a second time frame of the calendar that is different than the first time frame of the calendar,
a first duration of the first time frame matches a second duration of the second time frame,
the second baseline measurement period comprises a third time frame of the calendar that is different from the second time frame of the calendar, and
a third duration of the third time frame matches the second duration of the second time frame.

23. The system of claim 22, wherein the operations further comprise:
- displaying the candidate set of baseline measurement periods, wherein the first baseline measurement period is selected from the candidate set of baseline measurement periods.

24. The system of claim 22, wherein the evaluating comprises:
- applying a trained machine learning model to determine a plurality of similarity scores between the target measurement period and each prior measurement period of the plurality of prior measurement periods; and
- selecting the candidate set of baseline measurement periods based on a subset of similarity scores in the plurality of similarity scores above a threshold similarity value.

25. The system of claim 22, wherein the evaluating comprises comparing the operational parameters for the target measurement period to the operational parameters for each of the prior measurement periods to identify a system selected baseline measurement period.

26. The system of claim 22, wherein the target measurement period comprises a first starting point and the first baseline measurement period comprises a second starting point different from the first starting point.

27. The system of claim 22, wherein the target measurement period is based on a first iteration of a periodic event and the first baseline measurement period is based on an additional iteration of the periodic event occurring after the first iteration of the periodic event.

28. The system of claim 22, wherein the plurality of computing resources comprises a first portion associated with a distributed computing network and a second portion associated with a proprietary computing network.

29. The system of claim 28, wherein the plurality of computing resources comprises a plurality of databases.

30. The system of claim 28, wherein:
- the plurality of operational parameters comprises (1) a first subset of operational parameters associated with distributed computing network operations and (2) a second subset of operational parameters different from the first subset of operational parameters associated with proprietary computing network operations; and
- prior to the concurrently rendering, transforming one or both of the first subset and the second subset to enable direct comparison of the first subset of operational parameters to the second subset of operational parameters.

* * * * *